United States Patent [19]

Maldonado et al.

[11] 4,242,246

[45] Dec. 30, 1980

[54] PROCESS FOR THE PREPARATION OF BITUMINOUS COMPOSITIONS MAKING USE OF A MOTHER SOLUTION CONTAINING POLYMERS AND SULFUR

[75] Inventors: Paul Maldonado, St. Symphorien d'Ozon; Henri Dayre, Vienne; Germain Hagenbach, Vernaison, all of France

[73] Assignee: Elf Union, Paris, France

[21] Appl. No.: 48,035

[22] Filed: Jun. 13, 1979

[30] Foreign Application Priority Data

Jun. 21, 1978 [FR] France ............................... 78 18534

[51] Int. Cl.$^3$ ............................................. C08L 91/00
[52] U.S. Cl. ............................. 260/28.5 AS; 106/274
[58] Field of Search ................. 260/28.5 AS; 106/274

[56] References Cited

U.S. PATENT DOCUMENTS

| | | | |
|---|---|---|---|
| 3,963,659 | 6/1976 | Binder et al. | 260/28.5 AS |
| 3,992,340 | 11/1976 | Bonitz | 260/28.5 AS |
| 4,129,542 | 12/1978 | Metheson et al. | 260/28.5 AS |
| 4,130,516 | 12/1978 | Gagle et al. | 260/28.5 AS |

*Primary Examiner*—Melvyn I. Marquis
*Attorney, Agent, or Firm*—Burgess, Ryan and Wayne

[57] ABSTRACT

This invention relates to a new process for the preparation of improved polymeric bitumens.

The process is characterized by preparing a first composition by admixing a petroleum fraction (160°–230° C.), while stirring, at a temperature of from 80° C. to 120° C., with a copolymer made of styrenic blocks and dienic blocks such as a styrenebutadiene disequenced or multisequenced or statistical copolymer having a molecular weight varying between 30,000 and 300,000 and crystallized sulfur which is not chemically bound.

When homogeneity is obtained, a portion of said first composition is admixed for at least 15 minutes at a temperature of from 130° C. to 230° C., with a conventional bitumen (penetration 20–220) to form a fluid polymeric bitumen.

The fluid polymeric bitumen obtained by the process of the present invention is an excellent product characterized by superior properties and this product can be used in conventional spreading means when applying coatings onto roads.

12 Claims, No Drawings

PROCESS FOR THE PREPARATION OF BITUMINOUS COMPOSITIONS MAKING USE OF A MOTHER SOLUTION CONTAINING POLYMERS AND SULFUR

BACKGROUND OF THE INVENTION

This invention relates to a novel process for preparing a chemically modified bitumen by admixing, at an elevated temperature, a bitumen with a composition prepared by admixing a petroleum fraction with a polymer and free sulfur. The invention is also concerned with the product obtained by the aforesaid process.

The instant process produces modified bitumens possessing a combination of properties which make them useful for use as binders for road top coatings. A binder for road top coatings comprises bitumen—pure or containing polymers—to which is added fluidizing agents such as petroleum fractions or a coal-tar oil having a distillation range generally between 100° and 350° C. The fluidizing agent is necessary to make it possible for the bitumen or the modified bitumen to be used that is, spread when hot, by spreading equipment well known in the public works industry. It is known that the mechanical properties of bituminous binders are improved by the addition of elastomers.

Elastomers used to improve the properties of bitumen compositions include polyisoprene, butyl rubber, polyisobutene, ethylene-vinyl-acetate copolymers, polymethacrylates, polychloroprenes, styrene-butadiene rubber statistical copolymers, styrene-butadiene sequenced copolymers, and the like.

Among these elastomers, disequenced or multisequenced copolymers having a base of styrene and butadiene are known for their effectiveness. They are soluble in the bitumen to which they impart good mechanical properties as well as excellent elasticity.

It is known that the stability of such compositions can be increased and their scope of use enlarged by chemically coupling the bitumen and the polymers.

However, to obtain a homogeneous mixture, when it is possible, by the direct solubilization of the elastomer in the bitumens, the use of very effective mixing and stirring means is required as well as elevated temperatures generally between 180° C. and 200° C.

The direct solubilization requires long periods of time and substantial amounts of energy which have a pronounced impact on the cost of the operation.

The products obtained by the direct solubilization of the elastomers, even if they have acquired good mechanical properties, are characterized by high viscosities that make them difficult to spread by conventional chutes used in the spreading equipment. Further, to use the bitumens containing the directly solubilized elastomers, it is necessary (a) to modify the spreading equipment by providing the chute, for instance, with a hot oil circulation and therefore it is necessary to use more sophisticated equipment adapted to the new type of product, or (b) to find the conditions for emulsification of the product and spread it in the form of an aqueous emulsion. The conditions for emulsification may vary from one bitumen-polymer mixture to another and their use is difficult, or (c) to reduce the viscosity of the product to a convenient viscosity by addition of a solvent. Addition of a solvent, and an added mixing step, requires the difficult control of the supply product and solvent to the mixture.

The object of this invention is to overcome the difficulties and shortcomings of the prior art procedures by providing a process for the preparation of new fluid compositions of bitumens chemically coupled with polymers than can be directly used by conventional spreading means.

BRIEF SUMMARY OF THE INVENTION

The object of the invention for the preparation of fluid bitumen-polymer compositions is achieved by contacting and admixing at a temperature of from 130° C. to 230° C., from 85 to 95% by weight of a bitumen of a penetration between 20 and 220 and 5 to 15% by weight of a composition prepared by admixing, at an elevated temperature, (1) 75 to 80% by weight of a coal tar oil or petroleum fraction having a boiling range at atmospheric pressure of from 100° C. to 350° C., usually employed for cutting back (fluidizing) bitumens, (2) 20 to 25% by weight of a styrene-butadiene disequenced or multisequenced copolymer of a molecular weight varying between 30,00 and 300,000 preferably 70,000 to 200,000 and (3) 0.5 to 1.5% by weight of sulfur used as a reagent and continuously stirring the mixture thus obtained for at least 15 minutes.

Natural and synthetic bitumens or bitumens blown with air or vapor are useful for preparing the fluid bitumen-polymer compositions of the instant invention.

The composition prepared by admixing the petroleum fraction, the polymer and the sulfur used as a reagent, is effected under such conditions that a substantially homogeneous mixture is obtained. The temperature is generally maintained between 80° and 150° C. It is must be emphasized that the dissolution of the polymer in the petroleum faction is clearly quicker and easier than the dissolution of the same polymer directly in the bitumen.

The time and energy required to form a homogeneous composition from the petroleum fraction, polymer and sulfur is much lower than that required to form a homogeneous/mixture of the elastomers in the bitumens. The subsequent treatment of the polymeric bitumen is eliminated since, when the composition prepared from the petroleum oil fraction, polymer and sulfur is mixed with the bitumen, a fluid composition that fulfills the requirements of viscosity needed for good spreading is obtained.

In the process of the invention, it is possible to use the disequenced or multisequenced copolymers or statistical copolymers. These copolymers are well known to one skilled in the art and in certain cases, are available commercially. Therefore, it is not necessary, in this application, to provide a more detailed description of such polymers. However, the disequenced or multisequenced copolymers having a base of styrene or butadiene, for example, generally have a butadiene content of from 60 to 85% and a styrene content varying between 40 and 15% by weight.

The sulfur used in preparing the petroleum oil, polymer, and sulfur composition can be, for example, flowers or sulfur or orthorhombic crystallized sulfur known under the name of alpha sulfur.

However, the alpha crystallized sulfur is preferred since it has been observed that its solubilization in the petroleum fraction is obtained at a temperature substantially lower than that of flowers of sulfur. Sulfur is added in small quantities generally varying between 0.1 to 3% by weight, preferably from 0.5 to 1.5% by weight, in respect to the solvent.

The coal tar oil or petroleum fraction useful in the present invention has a distillation range, at atmospheric pressure, of from 100°–350° C. and preferably from 150° to 250° C. and most preferably, from 160° to 230° C., so that the solvent will be "heavy" enough for limiting evaporation when the composition containing petroleum fraction, polymer and sulfur is added to the bitumen and "light" enough to be eliminated after spreading the binder so as to recover rapidly, the mechanical properties that the bitumen-polymer binder would have had prior to the addition of the fluidizing composition.

After the petroleum fraction, polymer and sulfur composition is added to the bitumen, the mixture is stirred for a period of time sufficient to permit chemical grafting of the polymer on the bitumen by means of the sulfur which plays the dual role of coupling agent for the polymer with the asphaltenes of the bitumen and bridging agent between the chains of the polymers.

The action of the sulfur can be activated in the presence of a vulcanization accelerator of the type mercapto 2-benzothiazole, o-tolylguanidine, or of activators such as zinc stearate; however, excellent results are obtained without the use of accelerators which affords a supplementary advantage and simplification of the process.

This invention is directed not only to a process for the preparation of polymeric bitumens having improved mechanical properties but is also directed to simplifying the conditions for using the product obtained by the present process.

The present invention will be better understood in the light of the examples that appear hereinbelow which are given by way of illustration and not by way of limitation.

EXAMPLE 1: Example of Preparation of the Mother Solution

In a reactor of 500 l made of stainless steel and provided with a stirrer and with a double jacket reheatable by heat-conducting fluid, there are introduced 230 kg of a petroleum fraction of a naphthene/paraffinic nature characterized by:

an initial distillation point ASTM of 162° C.,
a final distillation point ASTM of 233° C., measured according to the ASTM D 8 667 standard.

Said petroleum fraction is further characterized by a flash point of 58° C. measured according to the Luchaire NF T 60 103 standard and by the volumetric mass Mv 15° C. =0.785 measured by the ASTM D 1657-64 standard.

The petroleum fraction is heated while stirring to a temperature of 100° C. ±5.

There is added at this temperature 2.4 kg of orthorhombic crystallized sulfur, then 62 kg of a powered styrene butadiene disequenced copolymer, conditioned by the addition of 2% silica as an antiagglomeration agent characterized by a molecular weight of 75,000 and a butadiene/styrene ratio of 75/25 by weight.

After stirring for 1 hour at the same temperature, there is obtained a homogeneous, fluid solution at ordinary temperature, characterized by the following physical properties:

kinematic viscosity measured at 50° C. in centistokes =1.207,
kinematic viscosity measured at 100° C. in centistokes =292, (viscosities measured according to the NFT 60100 standard).

This solution comprises the composition used to modify the bitumens in the following examples.

EXAMPLE 2: Example of Preparation of a Fluidized Formula of Bitumen-Polymers

At 170° C. in a vat of 2.5 m$^3$ provided with stirrers and steam heaters, there are pumped 2,160 kg of a direct distillation bitumen characterized by the following initial physical properties:

a softening point of 48° C. measured by the Bille and Anneau test according to the NFT 66008 standard,
a brittleness point (or Fraass point) of −18.5° C. measured according to the IP 80/53 standard,
a penetration measured in 1/10 mm at 25° C. according to the NFT 66 004 of 82 standard,
a viscosity of 170 measured in centistokes at 160° C. according to the NFT 60 100 standard.

There are then added while stirring at 170° C., 324.5 kg of the composition prepared in Example 1.

After stirring for 30 minutes at 170° C., there is obtained a fluid polymeric bitumen characterized by a viscosity of 97 centistokes measured at 160° C. comparable to that of a bitumen falling in the catagory of the 180–220 and capable of being spread by a conventional spreader at medium pressure.

It is well understood that in addition to the improvement brought by our process in the use of the binder, another advantage of the bitumen polymer composition is that once it is spread and the fluidizing agent evaporates, it acquires physical and rheological properties much superior to those of the initial bitumen and comparable to those compositions made without a fluidizing agent containing a proportion of polymers identical in relation to the bitumen.

The preparation of a composition, equivalent to that of the example after evaporation of the solvent, would require, when using the same stirring means as those used in this example, a homogenization period within the bitumen of at least 3 hours at 190° C. In addition, the viscosity of the product at 160° C. would be at least 360 centistokes. The advantage of the present process, in the sense of facilitating the spreading of the product, can be readily determined from a comparison of the viscosity.

The improved properties acquired by the fluid bitumen-polymer compositions according to the present invention, is illustrated in the following Table I which compares the properties of the composition of the present invention after evaporation of the fluidizing agent for 15 days at 50° C. to those of the basic bitumen and to those of the equivalent non-fluid bitumen-polymer compositions treated under the same conditions.

TABLE 1

| Characteristics Formulae | Penetration at 25° C. in 1/10 mm | Brittleness point in °C. | Softening point in °C. | Traction tests +20° C. 500 mm/mn | | | |
|---|---|---|---|---|---|---|---|
| | | | | $\sigma_s$ bars | $\sigma_r$ bars | $\epsilon_s$ % | $\epsilon_r$ % |
| Initial bitumen 80–100 fluidity after evaporation of the solvent 15j at 50° C. | 50 | −8 | 53 | 2.36 | 0.1 | 30 | 800 |

TABLE 1-continued

| Characteristics Formulae | Penetration at 25° C. in 1/10 mm | Brittleness point in °C. | Softening point in °C. | Traction tests +20° C. 500 mm/mn | | | |
|---|---|---|---|---|---|---|---|
| | | | | σs bars | σr bars | εs % | εr % |
| Non-fluidized bitumen polymers after 15j at 50° C. | 30 | −13 | 69 | 2.72 | 1.64 | 30 | 800 |
| Fluidized bitumen polymers after evaporation of solvent 15j at 50° C. | 45 | −14 | 64 | 3.5 | 1.38 | 30 | 800 |

Sigma σs constraint at threshold
Sigma σr constraint at rupture
epsilon εs % of elongation at threshold
epsilon εr % of elongation at rupture

What is claimed is:

1. A process for the preparation of a fluid bitumen-polymer composition which comprises: contacting, at a temperature of from 130° C. to 230° C., 85 to 95% by weight of a bitumen having a penetration of from 20 to 220 and 5 to 15% by weight of a second composition prepared by mixing a polystyrene-polydiene disequenced, multisequenced or statistical copolymer with a coal tar oil or a petroleum fraction having a distilling range at atmospheric pressure of about 100° to 350° C. and sulfur not chemically bonded and stirring the mixture of bitumen and said second composition for at least fifteen minutes.

2. A process according to claim 1, wherein said second composition is prepared by contacting, at a temperature of from 80° C. to 160° C., 75 to 80% by weight of a petroleum fraction, 20 to 25% by weight of a polystyrene-polydiene disequenced, multisequenced or statistical copolymer, and 0.5 to 1.5% by weight of sulfur not chemically bonded.

3. A process according to claim 2, wherein the temperature is 80° to 120° C.

4. A process according to claim 1 or 2, wherein the petroleum fraction is a naphthene-paraffinic petroleum fraction having an ASTM distillation range of from 150° C. to 250° C.

5. A process according to claim 1 or 2, wherein the polymer that forms part of said second composition is a polystyrene-polybutadiene disequenced copolymer having a molecular weight of from 70,000 to 200,000.

6. A process according to claim 1 or 2, wherein the chemically unbonded sulfur used for preparing said second composition is crystalline sulfur in the orthorhombic form.

7. A process according to claim 1 or 2, wherein the bitumen is an air blown direct distillation bitumen with initial penetration of from 20 to 220.

8. A process according to claim 1 or 2, wherein the sulfur is reacted in the presence of a vulcanization accelerator selected from the group consisting of a mercaptobenzothiazole, a di-orthotolylguanidine, and a metallic stearate.

9. A process according to claim 8, wherein the stearate is zinc stearate.

10. A process according to claim 1 or 2, wherein the fluid bitumen-polymer composition is obtained by adding said second composition to the bitumen to be modified and stirring the mixture for at least fifteen minutes at a temperature of from 130° C. to 230° C.

11. A process according to claim 10, wherein the mixture is stirred at a temperature of 140° to 180 ° C.

12. A fluid bitumen-polymer composition prepared by the process of claim 1 or 2.

* * * * *